(12) United States Patent
Sharony

(10) Patent No.: US 7,706,809 B2
(45) Date of Patent: *Apr. 27, 2010

(54) RF TRACKING SYSTEM AND METHOD

(75) Inventor: Jacob Sharony, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/332,436

(22) Filed: Jan. 13, 2006

(65) Prior Publication Data

US 2006/0125631 A1 Jun. 15, 2006

Related U.S. Application Data

(63) Continuation of application No. 10/215,998, filed on Aug. 8, 2002, now Pat. No. 7,019,663.

(51) Int. Cl.
*H04W 24/00* (2009.01)
*G08B 5/22* (2006.01)

(52) U.S. Cl. ............... 455/456.1; 455/41.2; 340/825.49

(58) Field of Classification Search ... 455/456.1–456.6, 455/41.2, 41.3, 552.1; 340/825.49, 10.4, 340/524, 539.13, 572.1, 825.72, 825.69, 340/531, 539.1; 370/338, 334
See application file for complete search history.

(56) References Cited

U.S. PATENT DOCUMENTS 6,480,108 B2 * 11/2002 McDonald ................. 340/505
6,486,794 B1 * 11/2002 Calistro et al. ......... 340/825.49
6,552,661 B1 * 4/2003 Lastinger et al. .......... 340/572.1
6,600,418 B2 * 7/2003 Francis et al. ............ 340/572.1
6,700,533 B1 * 3/2004 Werb et al. ............. 342/357.07
6,738,628 B1 * 5/2004 McCall et al. ............ 455/456.1
6,892,052 B2 * 5/2005 Kotola et al. .............. 455/41.2
6,920,330 B2 * 7/2005 Caronni et al. ........... 455/456.1
6,975,228 B2 * 12/2005 Wrasman et al. ......... 340/572.1
7,019,663 B2 * 3/2006 Sharony ................ 340/825.49
2001/0036810 A1 * 11/2001 Larsen ...................... 455/11.1
2002/0062385 A1 5/2002 Dowling
2003/0083076 A1 * 5/2003 Pradhan et al. ............. 455/456
2003/0104848 A1 * 6/2003 Brideglall .................... 455/574
2003/0235172 A1 * 12/2003 Wood ......................... 370/338
2004/0198459 A1 * 10/2004 Oba et al. .................... 455/566
2005/0079817 A1 * 4/2005 Kotola et al. ............... 455/41.2
2005/0156711 A1 * 7/2005 Aljadeff et al. .......... 340/10.34
2006/0168644 A1 * 7/2006 Richter et al. ................... 726/2

* cited by examiner

*Primary Examiner*—George Eng
*Assistant Examiner*—Brandon J Miller
(74) *Attorney, Agent, or Firm*—Glenn Frankenberger; Michael J. Giannetta

(57) ABSTRACT

Described is an RFID tracking system, an RFID tag and method, The tag includes a memory storing identification data and a radio frequency transceiver receiving a signal from a first wireless transceiver. The first wireless transceiver is part of a wireless wide area network (WWAN). The radio frequency transceiver transmits a response signal including the identification data to at least one second wireless transceiver. The at least one second wireless transceiver being part of a wireless local area network (WLAN). A location of the RFID tag is determined as a function of the response signal.

16 Claims, 4 Drawing Sheets

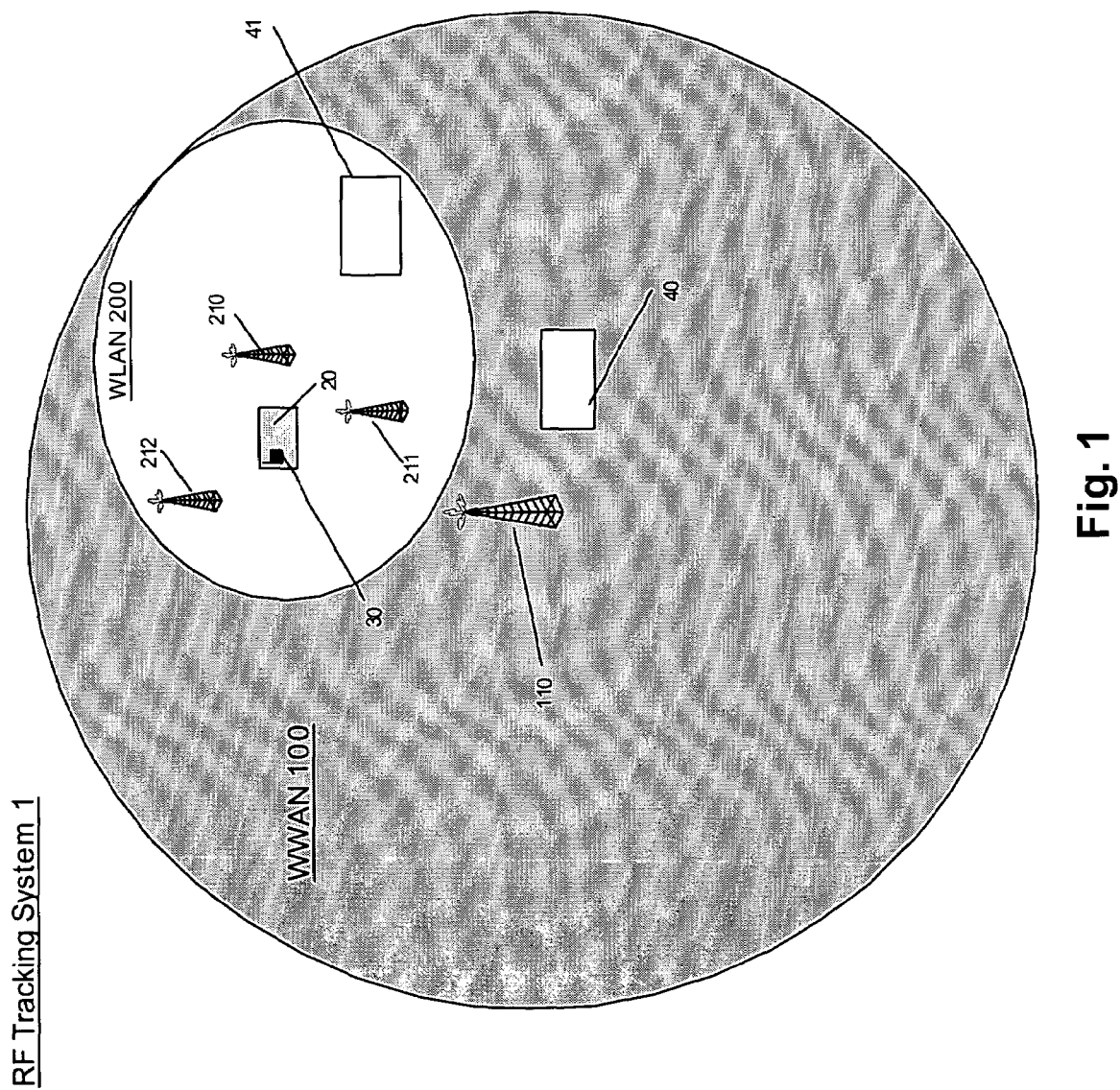

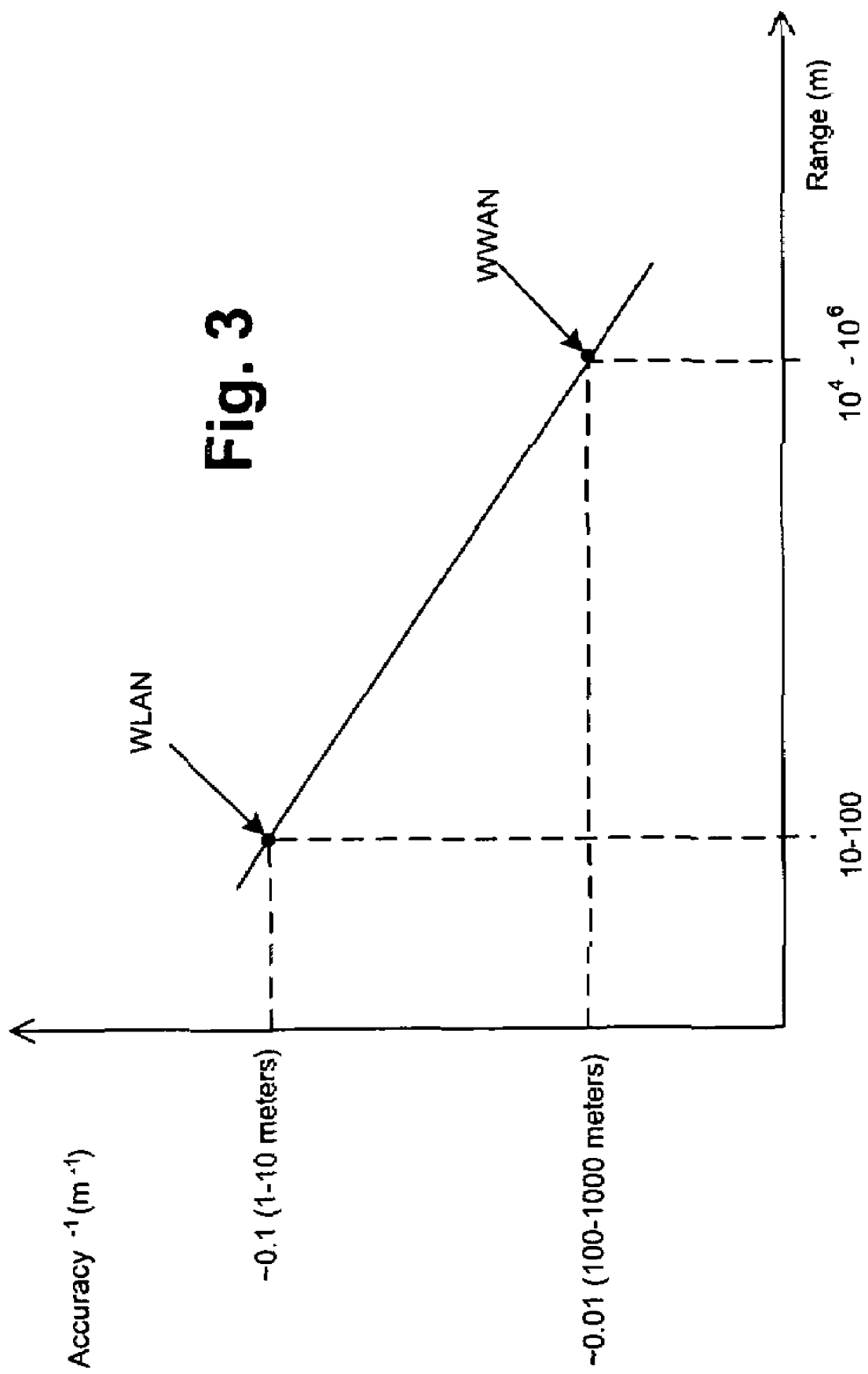

RF TRACKING SYSTEM AND METHOD

PRIORITY CLAIM

The present application is a Continuation application of U.S. patent application Ser. No. 10/215,998 filed Aug. 8, 2002 now U.S. Pat. No. 7,019,663 "RF Tracking System and Method", the entire disclosure of which is expressly incorporated herein by reference.

BACKGROUND INFORMATION

A conventional tracking system often utilizes Radio Frequency ("RF") tags attached to assets (e.g., a computer, a mechanical device, machinery, equipment, etc.) to identify, locate or track such assets. One of the major benefits of such an RF tracking system is that a line of sight ("LOS") between an RF reader or interrogator and the RF tag is not required for communication. This allows a large group of assets to be entered into the RF tracking system without any significant handling. In contrast to the RF tracking system, a bar code tracking system requires the LOS between a bar code reader and a bar code. Thus, either personnel or a mechanical asset is required to register enter the asset with the bar code tracking system. The registration may be done by, e.g., placing the bar code in front of the bar code reader.

Another advantage of the RF tracking system is that the RF tags are capable of surviving harsh and hostile environments, while the bar code may be easily damaged. These features make the RF tracking system more robust and easier to manage than the bar code tracking system.

However, even the RF tracking systems have disadvantages. For example, one of the disadvantages of the conventional RF tracking system is a trade-off between the accuracy in locating the RF tags and their operating range. The ability to locate remote or far away RF tags comes at the expense of accuracy in determining their location. A main contributor to this trade-off is a multipath spreading which is relatively significant in Wide Wireless Area Networks ("WWANs"). On the other hand, in Local Wireless Area Networks ("WLANs"), multipath signals are spread over a much smaller time range, and thus, the achieved accuracy is much greater. The problem with the WLANs is that it is inefficient to send requests to a large number of WLANs to determine a location of a particular asset with the RF tag. Therefore, there is a great need for a high-accuracy RF tracking system for locating remote or far-away assets having the RF tag.

SUMMARY OF THE INVENTION

The present invention relates to an RFID tracking system, an RFID tag and method, The tag includes a memory storing identification data and a radio frequency transceiver receiving a signal from a first wireless transceiver. The first wireless transceiver is part of a wireless wide area network (WWAN). The radio frequency transceiver transmits a response signal including the identification data to at least one second wireless transceiver. The at least one second wireless transceiver being part of a wireless local area network (WLAN). A location of the RFID tag is determined as a function of the response signal.

BRIEF DESCRIPTION OF DRAWINGS

FIG. 1 shows an exemplary embodiment of an RF tracking system according to the present invention;

FIG. 3 shows an exemplary graph which is indicative of characteristic differences of a Wireless Wide Area Network and a Wireless Local Area Network.

DETAILED DESCRIPTION

Figure 2A:
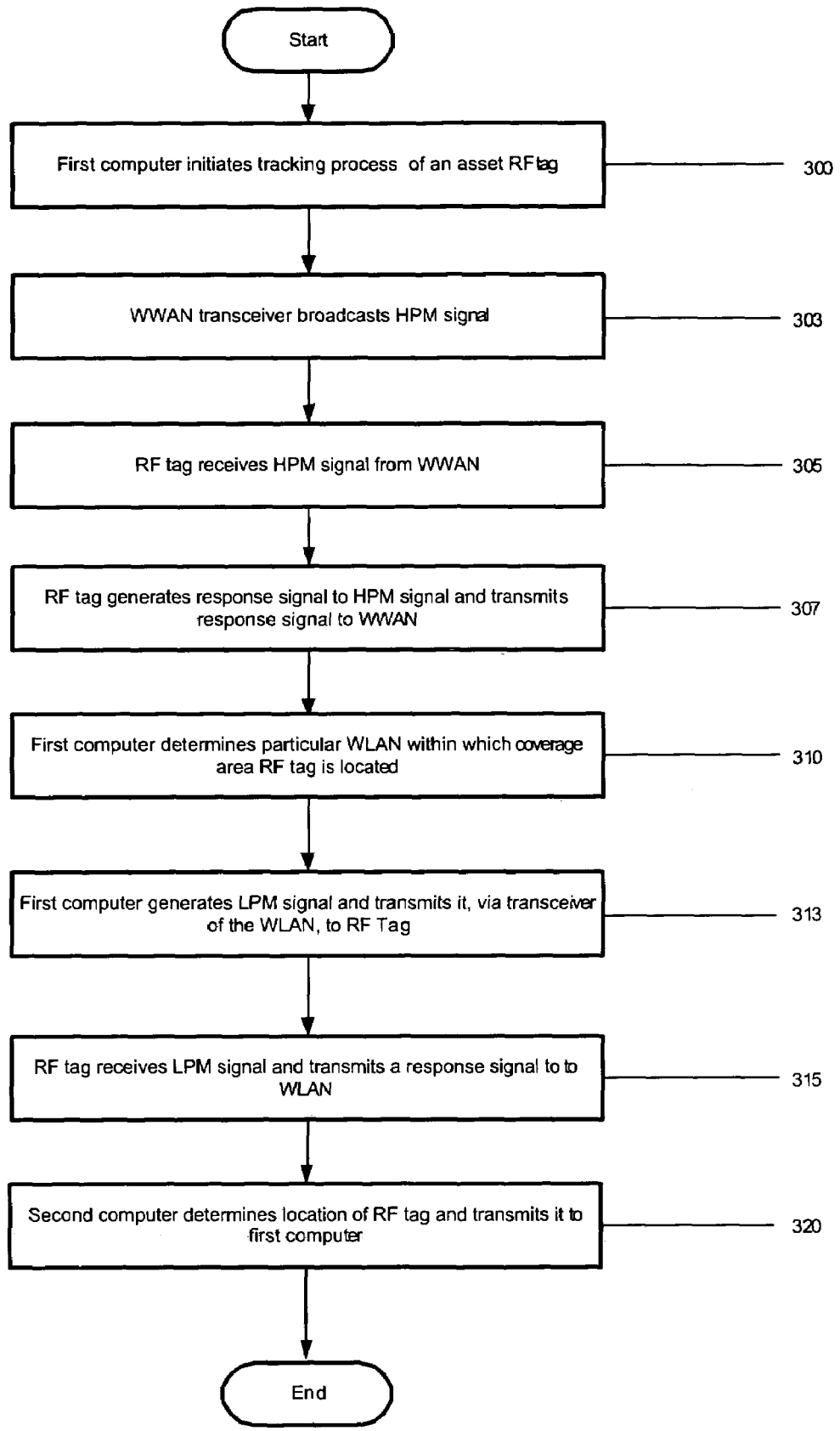
FIG. 2a shows an exemplary embodiment of a method according to the present invention.

FIG. 1 shows an exemplary embodiment according to the present invention of an RF tracking system 1 for tracking the location of an asset 20 having an RF tag 30. The RF tracking system 1 may operate within a Wireless Wide Area Network ("WWAN") 100 which may include a plurality of Wireless Local Area. Networks ("WLAN") (e.g. WLAN 200). The RF tag 30 may a dual mode tag which can communicate with both the WWAN 100 and the WLAN 200.

The WWAN 100 may include a plurality of transceivers 110 and a first computer 40 or other computing processing devices. The transceiver 110 transmits and/or receives signals to and from the RF tags 30 within the coverage area of the WWAN 100. The first computer 40 may perform a plurality of functions, such as generate signals to be transmitted to the RF tag 30, analyze signals received from the RF tag 30, determine a location of the RF tag 30, etc. In particular, the transceiver 110 is capable of transmitting to the RF tag 30 a High Powered Message ("HPM") signal. The HPM signal is a signal transmitted at a high power low bit-rate.

The WLAN 200 may be, e.g., a wireless system as described by IEEE 802.11b specifications. The WLAN 200 may include a plurality of transceivers 210, 211, 212 which communicate with a second computer 41. The second computer 41 communicates with the first computer 40. In particular, the transceiver 210 is capable of transmitting to the RF tag 20 a Low Powered Message ("LPM") signal. The LPM signal is a signal transmitted at a low power high bit-rate. Those skilled in the art will understand that the first computer 40 and the second computer 41 may be combined into a single computing arrangement.

FIG. 2a shows a flow chart describing a method according to the exemplary embodiment of the present invention utilized to locate the asset 20 having the RF tag 30. The method will be described with reference to FIG. 1. Those skilled in the art will understand that other systems having varying configurations, for example, different numbers of WWANs, WLANs, RF tags and assets may also be used to implement the exemplary method.

In step 300, the first computer 40 may initiate a tracking process of the asset 20 by generating the HPM signal. The HPM signal may include a plurality of data, e.g., an RF tag identification, an identifier of the asset 20, instructions to activate a response mode, etc. The HPM signal is transmitted to the transceiver 110 for broadcasting to the RF tag 30. In step 303, the transceiver 110 broadcasts the HPM signal (i.e., a high power low bit-rate signal/waveform) within the WWAN 100 coverage area. Typical specifications for the HPM are 1 Watt ("W") of power at a low bit rate of 10 kilobits per second ("Kbps"). The received Signal-to-Noise Ratio for the HPM is relatively low, thus allowing for the HPM signal to be received at large distances. As illustrated in FIG. 3, the HPM signal may allow to locate the asset 20 with an accuracy of 100 to 1,000 meters.

In step 305, the RF tag 30 receives the HPM signal and generates a response signal. The response signal may include identification of the RF tag 30, time of reception of the LPM signal, etc. The response signal is transmitted back to the WWAN 100 (step 307). In particular, the transceiver 110 of the WWAN 100 receives the response signal and forwards it to the first computer 40.

In step 310, the first computer 40 processes the response signal to determine the WLAN 200 within which coverage area the RF tag 30 is located. Such determination, may be made as a function of data included in the HPM and response signals, time difference of arrival the response signals, a power measurement of the response signal, etc.

Subsequently, the first computer 40 generates the LPM signal to determine a precise location of the asset 20. The LPM signal may include the RF tag identification, etc. The LPM signal is lower power high bit-rate and may be broadcasted to the asset 20 within the coverage area of the WLAN 200 using the transceivers 210-212 (step 313). Typical specifications for the LPM signal may be 100 milliwatts ("mW") of power at a high bit rate of upto 100 megabits per second ("Mbps"). As illustrated in FIG. 3, the LPM signal may allow to locate the asset 20 with an accuracy of 1 to 10 meters.

In step 315, the RF tag 30 receives the LPM signal and generates a response. The response is transmitted to the WLAN 200. The transceivers 210-212 receives the response signal to LPM signal and transmits the response signal along other data (e.g., such as time of receipt of the signal, power strength of the signal, etc) to the second computer 41. The second computer 41 processes the received data to determine a location of the RF tag 30 (e.g., X Y coordinates of the RF tag 30) and transmits it to the first computer 40 (step 320).

There are a number of ways of determining the location of the RF tag 30. For example, the location of the RF tag 30 may be determined by measuring a time difference of arrival ("TDOA") of the response signal. In particular, the transceivers 210-212 record the time when the response signal arrived at the corresponding transceiver. The arrival time, the response signal and location of each of the transceivers 210-212 are utilized by the second computer 41 to calculate the X Y coordinates of the RF tag 30.

In the alternative exemplary embodiment, the X Y coordinates may be determined using a power measurement reading of the response signal (i.e., a Received Signal Strength Indication ("RSSI") method). The RSSI method utilizes the intensity of the response signal and compares it with predetermined geographically marked points. For example, the WLAN 200 has a certain number of marked points; each point has a measured power reading. Then, the second computer 41 compares the powered reading of the response signal received by each of the transceivers 210-212 to the marked power reading. Based on this comparison, the X Y coordinates of the RF tag are determined.

Another method of determining the X Y coordinates of the RF tag 30 is similar to the first method described above, except that the RF tag 30 receives beacons from the transceivers 210-212 and records the time of reception of these beacons. The reception time is included into the response signal and transmitted to the WLAN 200. The second computer 41 utilizes the data included in the response along with data received from the transceivers 210-212 (e.g., exact location of transceivers 210-212 and time when the beacons were transmitted to the RF tag 30) to calculate to the X Y coordinates.

Figure 2B:
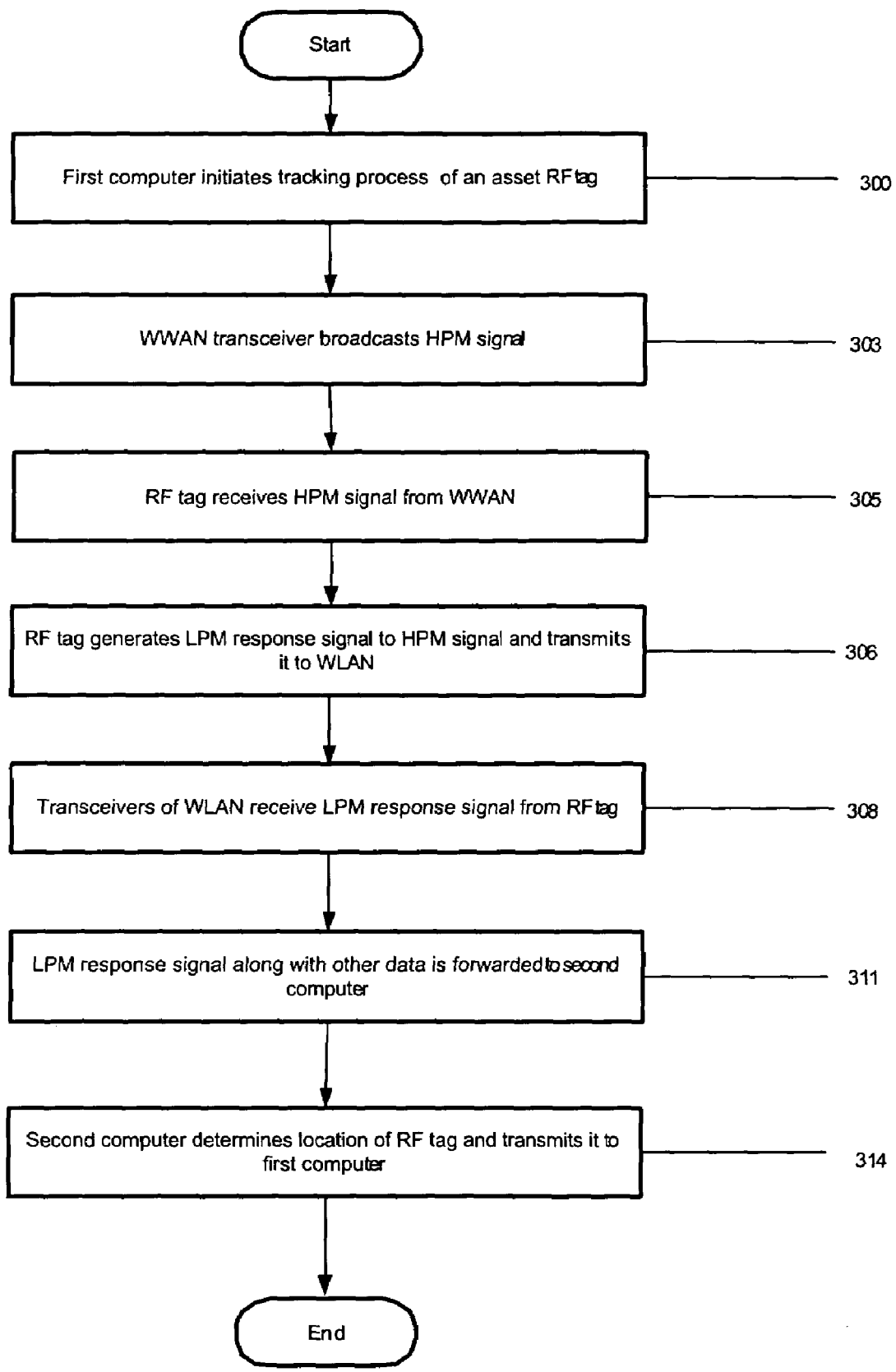
FIG. 2b shows another exemplary embodiment of a method according to the present invention.

FIG. 2b shows another exemplary embodiment of the method according to the present invention. According to this method, the steps 300-305 are substantially similar to steps shown in FIG. 2a and described above.

In step 306, the RF tag 30 generates a response signal which is LPM signal. The LPM response signal may include RF tag identification, time of reception of the HPM signal, etc. The LPM response signal is transmitted to the WLAN 200.

The transceivers 210-212 of the WLAN 200 receive the LPM response and record exact time of the reception (step 308). Then, the transceivers 210-212 forward the LPM response signal along with its geographical location and time of the reception to the second computer 41 (step 311). Based on the information provided, the second computer 41 calculates the X Y coordinates of the RF tag 20 utilizing one of the method described above. The X Y coordinates then may be forwarded to the first computer 40. Those skilled in the art would understand that other data may collected that would allow to determine a location of the asset 20, e.g., using one of the three above-described methods.

The present invention may be utilized in a plurality of industries. For example, it may be utilized for tracking the assets 20 in airports. First, the HPM signal is transmitted within the WWAN 200 which covers, e.g., the New York Metropolitan Area. The asset 20 having the RF tag 30 is located within the area which is covered by the WLAN 200, e.g., JFK International Airport. Then, the LPM signal is broadcasted to the RF tag 30 using the transceiver 210 of the WLAN 200. Based on the response signal to the LPM signal generated by the RF tag 30, the second computer 41 would be able to determine that the asset 20 is located at a specific location, e.g., Gate 11 in Terminal B.

Alternatively, the RF tag 30 may generated a LPM response signal to the HPM signal. The LPM response signal is transmitted to the WLAN 200. The second computer 41 of the WLAN 200 determined exact position of the RF tag 30.

The present invention has been described with reference to an embodiment having a single RF tag 30, the WWAN 100, the WLANs 200 and transceivers 110, 210-212 for each corresponding network. One skilled in the art would understand that the present invention may also be successfully implemented, for example, for a plurality of RF tags 30 and a plurality of the WLANs 200. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. An RFID tag, comprising:
   a memory storing identification data; and
   a radio frequency transceiver receiving a signal from a first wireless transceiver, the first wireless transceiver being part of a wireless wide area network (WWAN),
   wherein the RFID tag is a dual-mode tag receiving communications from the WWAN and a wireless local area network (WLAN),
   wherein the radio frequency transceiver transmits a response signal including the identification data to at least one second wireless transceiver, the at least one second wireless transceiver being part of the WLAN, and
   wherein a location of the RFID tag is determined as a function of the response signal.

2. The RFID tag according to claim 1, further comprising: a power supply.

3. The RFID tag according to claim 1, wherein the response signal includes at least one of (i) a first reception time of the signal, (ii) a first signal strength of the signal and (iii) the identification data.

4. The RFID tag according to claim 1, wherein the WWAN includes at least three transceivers.

5. The RFID tag according to claim 1, wherein the WLAN is an IEEE 802.11 network.

6. The RFID tag according to claim 1, wherein the signal is a high power, low bit rate signal.

7. The RFID tag according to claim 1, wherein the response signal is a low power, high bit rate signal.

8. The RFID tag according to claim 1, wherein the identification data includes at least one of a serial number, a MAC address and a BSSID.

9. An RFID tag, comprising:
a memory storing identification data; and
a radio frequency transceiver receiving a first signal from a first wireless transceiver, the first wireless transceiver being part of a wireless wide area network (WWAN),
wherein the RFID tag is a dual-mode tag receiving communications from the WWAN and a wireless local area network (WLAN),
wherein the radio frequency transceiver transmits a first response signal including the identification data to the first wireless transceiver,
wherein the radio frequency transceiver receives a second signal from a second wireless transceiver, the second wireless transceiver being part of the WLAN,
wherein the radio frequency transceiver transmits a second response signal including identification data to the second wireless transceiver, and
wherein a location of the RFID tag is determined as a function of the second response signal.

10. The RFID tag according to claim 9, further comprising: a power supply.

11. The RFID tag according to claim 9, wherein the second wireless transceiver is selected from a plurality of wireless transceivers of the WLAN as a function of the first response signal.

12. The RFID tag according to claim 9, wherein the response signal includes at least one of (i) a first reception time of the signal, (ii) a first signal strength of the signal and (iii) the identification data.

13. The RFID tag according to claim 9, wherein the WWAN includes at least three transceivers.

14. The RFID tag according to claim 9, wherein the WLAN is an IEEE 802.11 network.

15. The RFID tag according to claim 9, wherein the signal is a high power, low bit rate signal.

16. The RFID tag according to claim 9, wherein the response signal is a low power, high bit rate signal.

* * * * *